(12) United States Patent
Slater et al.

(10) Patent No.: US 7,984,236 B2
(45) Date of Patent: Jul. 19, 2011

(54) DATA TRANSFER

(75) Inventors: Alastair Slater, Chepstow (GB); Simon Pelly, Bristol (GB); Matthew Jack Burbridge, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 648 days.

(21) Appl. No.: 11/854,731

(22) Filed: Sep. 13, 2007

(65) Prior Publication Data

US 2009/0077309 A1   Mar. 19, 2009

(51) Int. Cl.
*G06F 12/00* (2006.01)
(52) U.S. Cl. ........................................ 711/111; 711/162
(58) Field of Classification Search .................. 711/111, 711/162
See application file for complete search history.

(56) References Cited

U.S. PATENT DOCUMENTS

| | | | |
|---|---|---|---|
| 6,061,309 A * | 5/2000 | Gallo et al. | 714/13 |
| 7,505,980 B2 * | 3/2009 | Tyndall et al. | 1/1 |
| 2003/0009645 A1 * | 1/2003 | Dahman et al. | 711/167 |
| 2005/0050263 A1 * | 3/2005 | Ashton et al. | 711/111 |
| 2005/0190660 A1 * | 9/2005 | Wakelin et al. | 369/30.27 |
| 2006/0149898 A1 * | 7/2006 | Bello et al. | 711/111 |
| 2007/0022240 A1 * | 1/2007 | Gallo et al. | 711/4 |
| 2007/0266204 A1 * | 11/2007 | Mizuno | 711/111 |
| 2008/0114932 A1 * | 5/2008 | Kobayashi | 711/114 |

* cited by examiner

*Primary Examiner* — Hashem Farrokh

(57) ABSTRACT

A virtual tape library including a module which is operable to issue input and output commands to a tape drive connected to the virtual tape library, wherein an input command is a command to write data to a tape connected to the tape drive and an output command is a command to read data from a tape connected to the tape drive.

8 Claims, 6 Drawing Sheets

DATA TRANSFER

BACKGROUND OF THE INVENTION

Data held on a first data storage device may be copied to a second data storage device remote from the first data storage device for data security purposes in a backing-up procedure. Should data on the first data storage device be deleted or damaged, the data can be recovered by accessing the second data storage device over a communication network and, potentially, copying the data back to the first data storage device. The original data on the first data storage device may, itself, be a copy of data held on a primary data storage device.

The communication network has a capacity and much of the capacity of the network may be absorbed in activities other than the copying data between the first and second data storage devices. As such, the capacity of the communication network may be in high demand. Backing-up data is, therefore, usually limited to periods of low network demand. During certain periods backing-up procedures may not be possible due to the level of network usage.

SUMMARY OF INVENTION

An embodiment of the present invention provides a virtual tape library apparatus, comprising: a virtual tape library; a tape drive connected to the virtual tape library, the tape drive being operable to receive a tape, wherein read and write operations to and from the tape drive are controlled by the virtual tape library and, the virtual tape library comprises: one or more library media; one or more virtual data tapes stored on the one or more library media; and a control module coupled to the tape drive and one or more library media, the control module being operable to control the copying of a data between the virtual tape library and a tape received in the tape drive.

In an embodiment, the tape drive is attached to the virtual tape library.

In an embodiment, the tape drive is directly connected to the virtual tape library.

An embodiment of the invention provides a virtual tape library system, comprising: a rack including a processing unit and two or more device receiving slots; a first virtual tape library storage device attached to the rack at a first device receiving slot, the first virtual tape drive storage device having one or more virtual tapes stored thereon; and a first tape drive attached to the rack at a second device receiving slot and coupled to the first virtual tape library storage device, wherein the processing unit is coupled to the first virtual tape library storage device and the first tape drive and controls the movement of tape data between the first virtual tape library storage device and the first tape drive.

An embodiment of the present invention provides a virtual tape library system comprising: one or more library media with one or more virtual tapes stored thereon; and a firmware module which is operable to issue input and output commands to a tape drive connected to the virtual tape library system, wherein an input command is a command to write data to a tape connected to the tape drive and an output command is a command to read data from a tape connected to the tape drive.

In an embodiment, the input and output commands form part of a command set for the tape drive and at least part of the command set is stored on the virtual tape library system.

An embodiment of the invention provides a method of writing data to a virtual tape library system from a tape comprising the steps of: receiving an instruction to write data to a virtual tape library system from a tape; reading data from the tape; writing the read data to the virtual tape library; reading auxiliary data from an auxiliary memory of the tape; and writing at least part of the auxiliary data to the virtual tape library.

In an embodiment, the at least part of the auxiliary data comprises an identifier for that tape.

BRIEF DESCRIPTION OF THE DRAWINGS

Embodiments of the invention will now be described, by way of example, with reference to the accompanying drawings in which.

DETAIL DESCRIPTION

Figure 1:
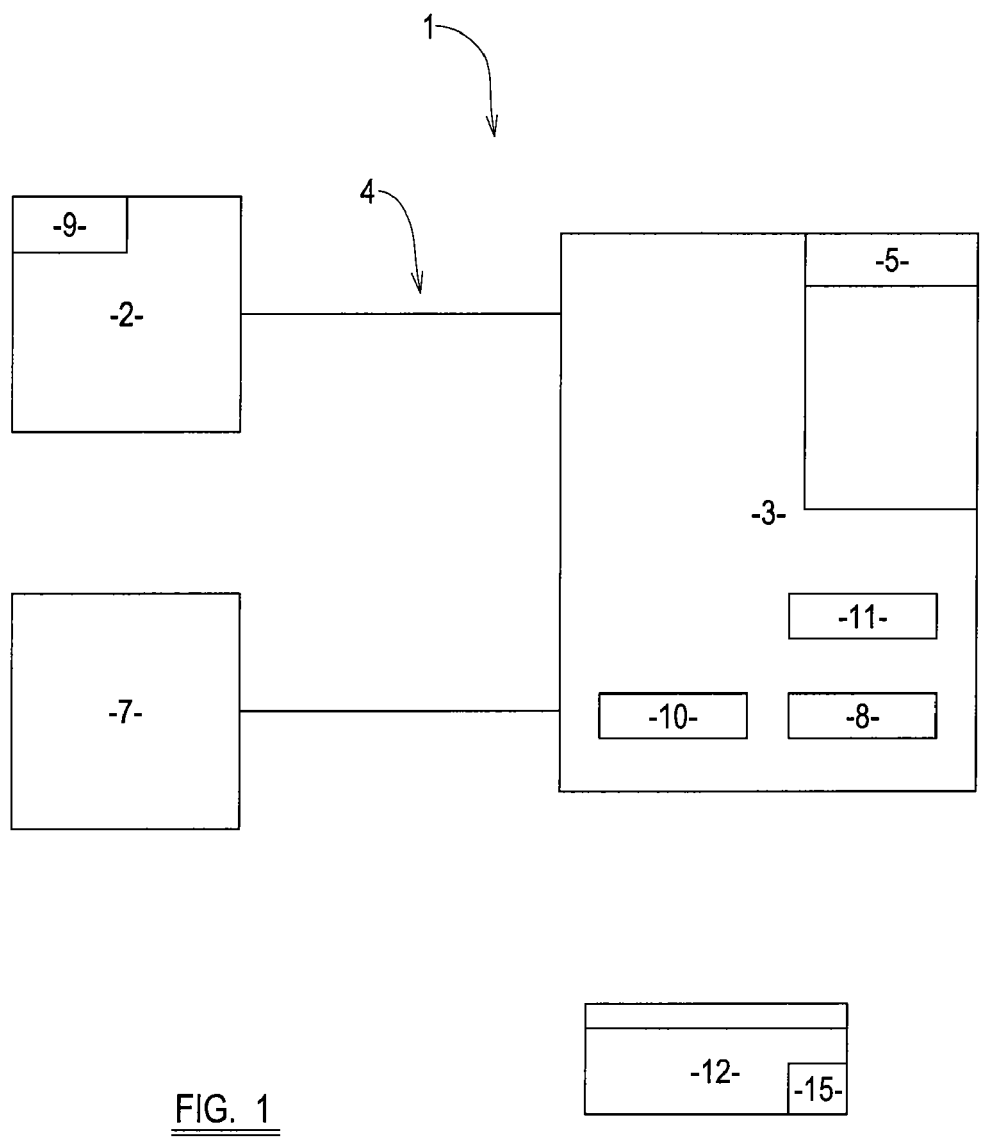
FIG. 1 shows a schematic representation of an apparatus in accordance with an embodiment of the invention.

FIG. 1 shows a schematic representation of an apparatus 1 in accordance with an embodiment of the invention. The apparatus 1 comprises a first device 2 which may be connected to a data storage device 3 over a first communication network 4. The data storage device 3 comprises a virtual tape library 3 and may store one or more data sets or partial data sets. Each data set or partial data set may represent a virtual tape.

The one or more data sets may include one or more filemarks (for example, to mark the end of a file) and/or one or more block separators (for example, to mark the end of a block). A data set may include one or more data blocks. A data set may include one or more data files.

A virtual tape may be a volume of data which is stored in a format which corresponds with a format that the volume of data would be stored in if the data volume was stored on a tape. In an embodiment, the virtual tape format is a compacted version of the corresponding tape format. As such, the virtual tape library may include data chunks which represent sections of data.

The virtual tape library 3 is, in an embodiment, operable to communicate with other devices as if it was a tape library; the inputs and outputs of the virtual tape library 3 to the other devices mimic those of a tape library.

Figure 3:
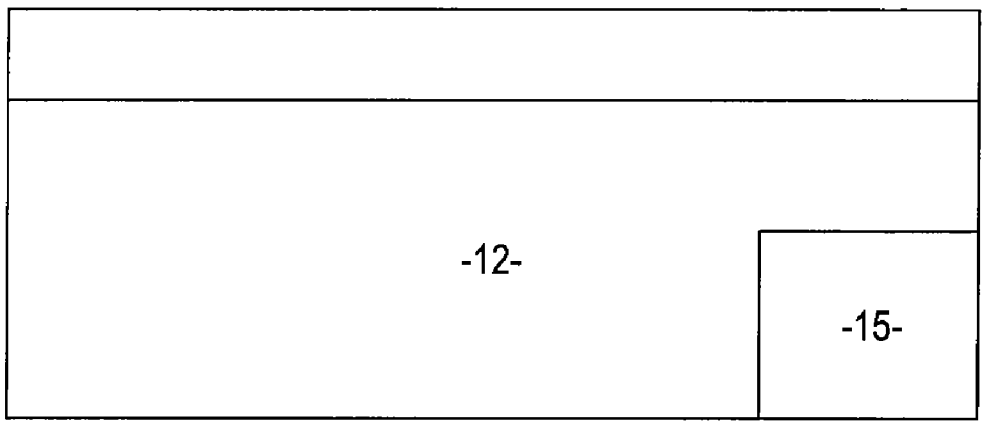
FIG. 3 shows a schematic representation of a tape.
Figure 5:
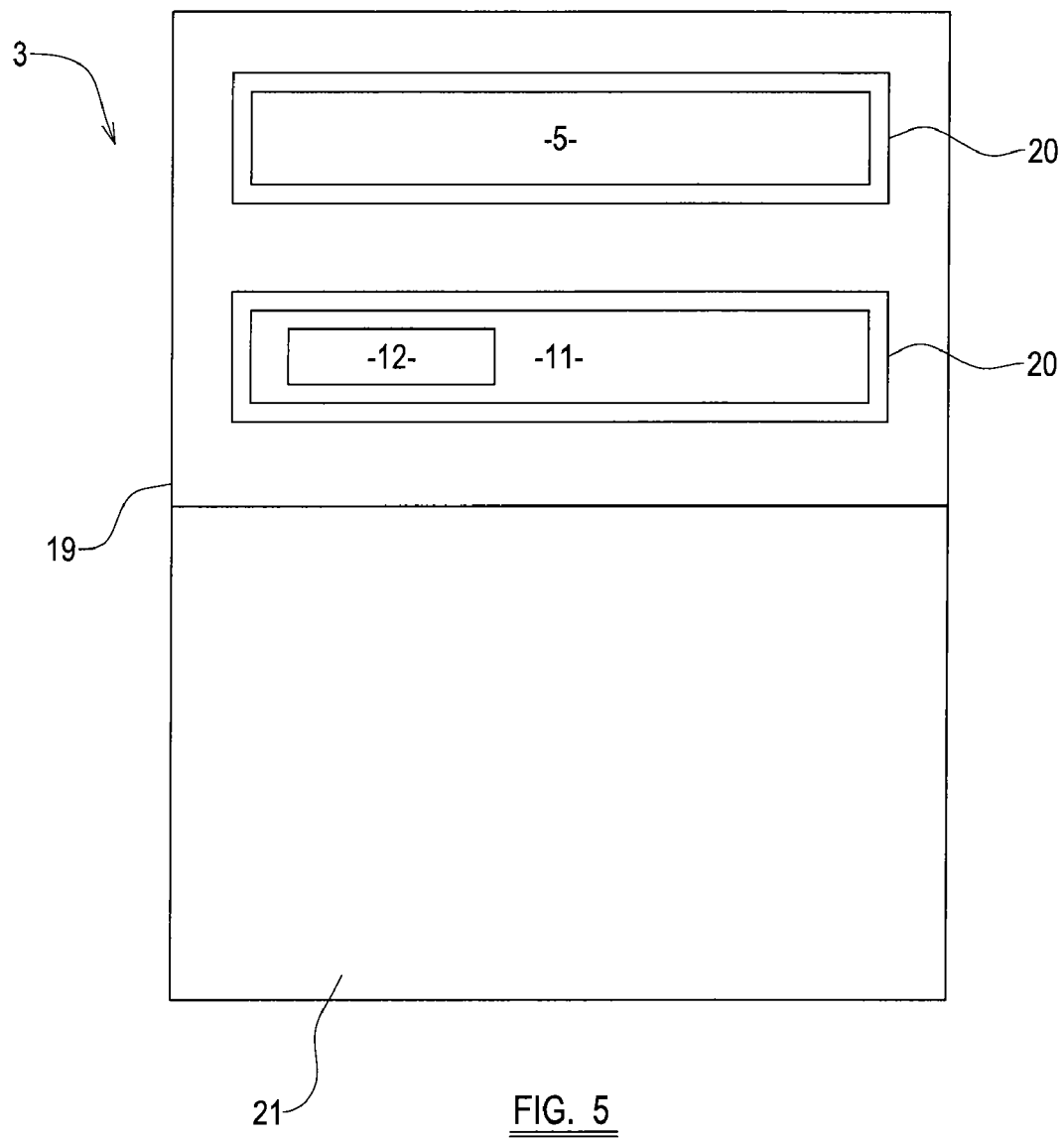
FIG. 5 shows a schematic representation of a rack in accordance with an embodiment of the invention.

In an embodiment of the invention, the virtual tape library 3 is connected to one or more library media 5 (see FIG. 3). In an embodiment, the virtual tape library 3 is attached to one or more library media 5. In an embodiment, the one or more library media 5 comprise one or more library data storage devices 5. The one or more library media 5 may constitute the storage medium for the virtual tape library 3 on which on or more virtual tapes may be stored. In an embodiment, the virtual data library 3 comprises a rack 19 (see FIG. 5) with one or more library media receiving members to which respective library media 5 may be attached and connected. The library media 5 may include: a magnetic storage device (such as a hard disk), an optical storage device (such as digital versatile disk), or an electronic storage device (such as flash memory). In an embodiment, the one or more library media 5 may comprise an array of magnetic storage devices. The array may be a RAID array. In an embodiment, the rack 19 has two or more device receiving slots 20 and at least one of the receiving slots 20 is operable to receive a library medium 5 and at least one of the receiving slots 20 is operable to receive a tape drive 11. The rack 19 may include a processing unit 21.

The data storage device 3 may be connected to a second communication network 6.

The first 4 and second 6 communication networks may comprise a local area network or a wide area network. The networks 4,6 are operated using respective network protocols which may be the same network protocol for each network 4,6. One or more further devices 7 may be connected to the first 4 and/or second 6 communication networks. The first communication network 4 may comprise a direct connection between the first device 2 and the data storage device 3 to which other devices 7 are not connected.

The data storage device 3 may maintain one or more indices 8 which record the format and/or shape of data within one or more data sets which are stored on the library media 5. An index 8 may form part of a data set. For example, the index 8 may record the sizes of blocks of data stored in the data set, the location or locations of the first data in the data set and/or a block of the data set, the location or locations of the last data in the data set and/or block of the data set, and/or the location of one or more filemarks within the data set. The location information may be provided as a logical address based on a known location in the data set (for example, with respect to the first data item or byte of the data set). A unique or substantially unique identifier for a block or set of data may be stored in the one or more indices 8 in order to aII identification of the one or more data sets.

In an embodiment, a single index 8 may be maintained for a single data set. In an embodiment, a single index 8 may be maintained for multiple data sets.

The one or more indices 8 may be updated following input or output functions of the data storage device 3 which act on the one or more data sets and, therefore, result in a change of one or more of the records in the one or more indices 8.

The data storage device 3 may comprise a compacting virtual tape library.

The first device 2 may comprise a computer or processing apparatus. In an embodiment, the first device 2 includes a user interface 9 which allows a user to control the movement of data to and from the library media 5 of the data storage device 3.

Figure 2:
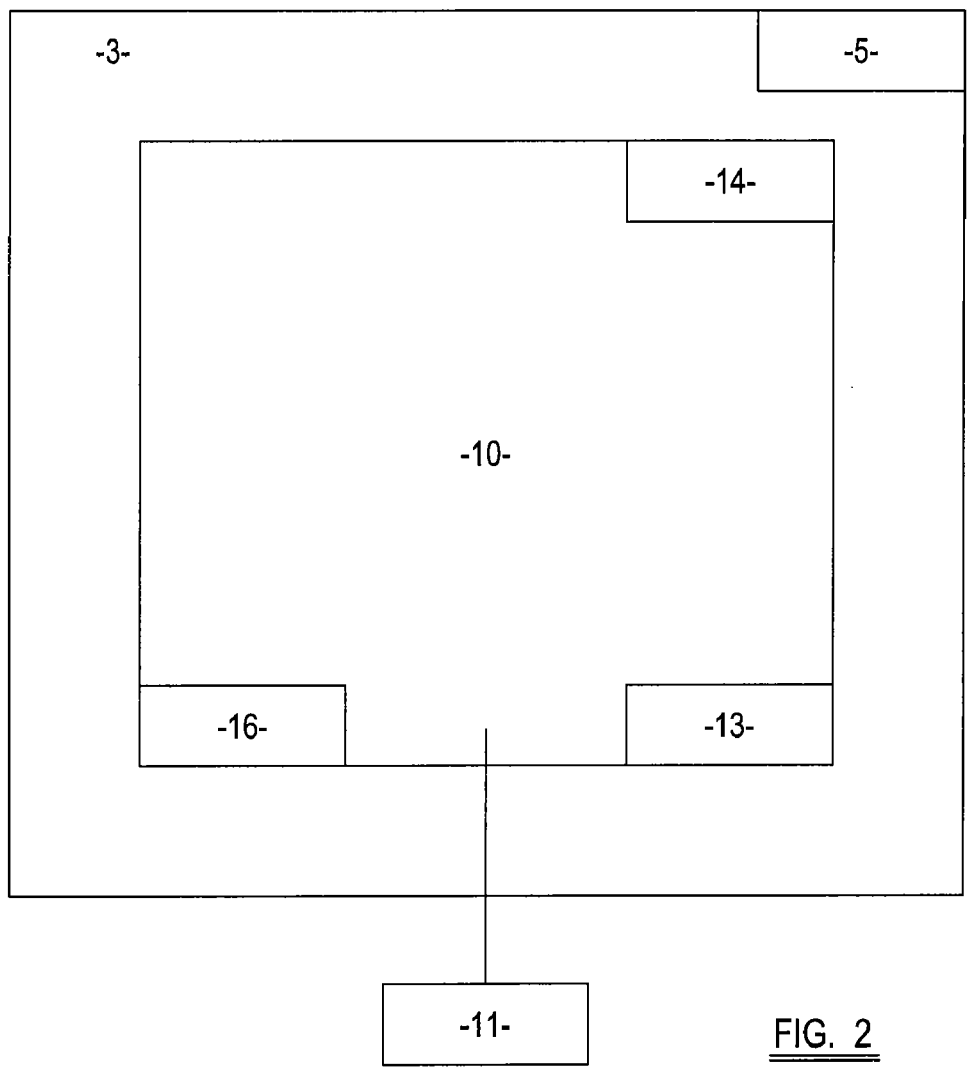
FIG. 2 shows a control module, tape drive, and library media in accordance with an embodiment of the present invention.
Figure 4:
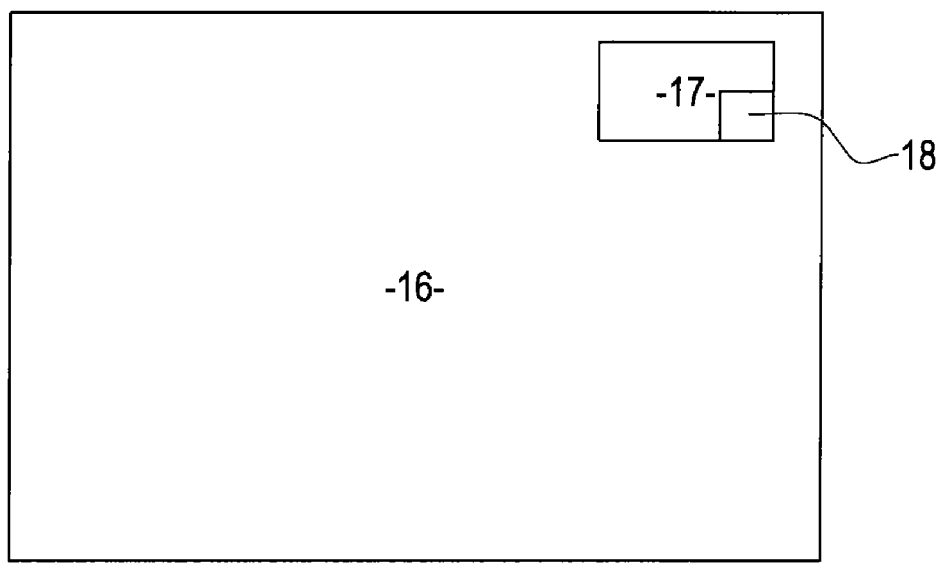
FIG. 4 shows a schematic representation of firmware in accordance with an embodiment of the invention.

The data storage device 3 includes a control module 10 (see FIG. 2) which is operable to communicate with the first device 2 in order to effect user commands initiated on the first device. The control module 10 may include firmware 16. The data storage device 3 may include one or more tape drives 11 each suitable to receive or to be connected a tape 12 (see FIG. 3). In an embodiment, the tape 12 is located in a library of tapes 12. In an embodiment, the data storage device 3 is operable to pass input and output commands to one or more tape drives 11 connected to the data storage device 3. In an embodiment, the input and output commands comprise write and read instructions respectively. In an embodiment, the input and output commands are made in accordance with a command set 18 of the one or tape drives 11. In an embodiment, the command set 18 is part of a driver 17 for the one or more tape drives 11. In an embodiment, the driver 17 is located on firmware 16 of the data storage device 3 (see FIG. 4).

In an embodiment of the invention, at least one of the one or more tape drives 11 is only able to receive a single tape 12 at a given time. In an embodiment of the invention, the one or more tape drives 11 may be connected and attached to the virtual tape library 3. In an embodiment of the invention, the one or more tape drives 11 are directly connected to the virtual tape library 3; in this embodiment, the one or more tape drives 11 are not connected to the virtual tape library 3 through a server; in an embodiment, the one or more tape drives 11 are directly connected to the virtual tape library 3 through a single data controller 13 which links the or each tape drive 11 to a data bus of the virtual tape library 3 without the need for another data controller. In an embodiment, the one or more tape drives 11 are directly attached to the virtual tape library 3. The data controller may form part of the control module 10.

In an embodiment the or each tape drive 11 is connected to the virtual tape library 3 by a SCSI, IDE, Fibre Channel, ANSI FC-SB-3 (Single-Byte Command Code Sets-3 Mapping Protocol), ESCON, parallel port, USB, IEEE 1394 or other interface.

In an embodiment of the invention, the or each tape drive 11 is a tape drive which is connected to the virtual tape library 3 through a data bus. In an embodiment of the invention, each tape drive 11 is a tape drive which is not connected to the virtual tape library 3 using an Ethernet connection. In an embodiment of the invention, each tape drive 11 is controlled by an operating system of the virtual tape library 3. In an embodiment of the invention, each tape drive 11 is controlled by firmware in the virtual tape library 3. In an embodiment of the invention, each tape drive 11 is controlled by an operating system of the virtual tape library 3 in combination with firmware located in the virtual tape library 3.

In an embodiment, each tape drive 11 comprises a tape drive which is fitted to the virtual tape library rack 19.

In an embodiment, each tape drive 11 is under the direct control of a processing unit of the data storage system 3. In other words, the tape drive 11 is not under the control of, for example, a server processor which is, itself, under the control of the processing unit of the data storage system 3.

The control module 10 may, in some embodiments, comprise a processing unit.

The control module 10 may include a table 14 of characteristics for transfer operations for tapes 12 which may be connected to the one or more tape drives 11. The characteristics may include, in an embodiment, an identifier for the type of tape 12, and a transfer threshold for the tape 12. In an embodiment, the characteristics include a tape capacity, maximum data write rate, and/or maximum data read rate. The transfer threshold may be a minimum size for a volume of data which should transferred to the tape 12 in a single transaction.

In operation, if the size of a data volume which is waiting to be transferred to the tape 12 is below the threshold, then the data of the data volume may be buffered until additional data has been added to the data volume to bring the total data volume size above the threshold. Transferring data to the tape 12 in this manner allows data to be effectively streamed to the tape 12. The streaming of data is often a more efficient method of transferring data to a tape 12. In an embodiment of the invention, a transfer threshold may be dependent upon the tape drive 11 and/or the data storage device 3.

The first device 2 connected to the data storage device 3 is operable to issue one or more instructions to the data storage device 3; these instructions are issued over the first communication network 4. The one or more instructions may include instructions to move a tape 12 into a tape drive 11 or to eject a tape 12 from a tape drive 11. The one or more instructions may include instructions to copy one or more data sets or a portion thereof from the one or more library media 5 of the data storage device 3 to one or more tapes 12 located in one or the one or more tape drives 11 of the data storage device 3 (ie. an off-loading process). The one or more instructions may include instructions to copy one or more data sets or a portion thereof from one or more tapes 12 located in the one or more tape drives 11 of the data storage device 3 to the one or more library media 5 of the data storage device 3 (ie. an in-loading process).

A graphical user interface may be presented at the first device 2 to allow a user to view a visual representation of the data storage device 3 and other parts and components of embodiments of the present invention. The first device 2 may accept "drag-and-drop" commands input by a user and output the associated one or more instructions to instruct the data storage device 3 to carry out the user's commands.

The one or more tape drives 11 of the data storage device 3 are not connected to the data storage device 3 across the first 4 or second 6 communication networks; therefore, the communication networks 4,6 need not be utilized to copy data from the data storage device 3 to a tape 12 or vice versa (ie. to in-load or off-load data). As such, an embodiment of the present invention may result in a decreased use of both or one of the communication networks 4,6; as the capacity of the networks 4,6 may be in high demand, this may constitute an advantage over prior systems.

Moreover, it is not necessary to connect a server to the first 4 or second 6 communication network, the server including connections to one or more data tapes which may be located in tape drives of the server, to achieve in-loading and off-loading processes; instead there is a direct connection between the tape drives 11 and the virtual tape library 3. Thus, embodiments of the present invention may provide a simpler network configuration for the connection of tapes 12 to a virtual tape library 3 for the transfer of data between the tapes 12 and the virtual tape library 3.

When the control module 10 receives an instruction to copy data from the library media 5 to one or more tapes 12 connected to the one or more tape drives 11 of the virtual tape library 3 (ie. an out-loading transaction) then, in an embodiment, the control module 10 checks whether or not one or more appropriate tapes 12 are connected to the one or more tape slots 11.

An appropriate tape 12 may be a tape 12 of a specified identity or a tape 12 of one or more specified types (for example, tape 12 sufficiently large to store the data which the virtual tape library 3 has been instructed to copy to the tape 12 and/or a tape 12 which can accept data in the format in which it is stored on the library media 5—eg. with regard to block size).

If the data storage device 3 is connected to a tape library, then the control module 10 may instruct the library to locate an appropriate tape 12 and to connect the tape 12 to one of the tape drives 11.

If an appropriate tape 12 cannot be connected to one or more tape drives 11, then the control module 10 issues an error signal. In an embodiment, the control module 10 may ignore or delete an out-loading transaction if no appropriate tape 12 can be or is connected to the one or more tape drives 11. The error signal may be transmitted to the first device 2.

By way of example, an appropriate tape 12 will be assumed to have been located and connected to a tape drive 11.

The control module 10 then mounts the tape 12 and determines whether or not the tape 12 is blank. In an embodiment the control module 10 determines whether or not the tape 12 is write-protected. If the tape 12 is not blank then an error signal is issued and, in an embodiment, a user may be prompted to instruct the control module 10 to locate one or more other appropriate tapes 12. A user may be prompted, as a result of the error signal, to instruct the control module 10 to overwrite the tape 12. If the tape 12 is write-protected then an error signal is issued and, in an embodiment, a user may be prompted to instruct the control module 10 to locate one or more other appropriate tapes 12. The first device 2 or the control module 10 may be provided with default instructions which are processed should the user not respond to the error signal, or automatically in the event of an error signal.

The control module 10 may interrogate the table 14 of tape transfer characteristics in order to determine the transfer threshold for each particular transaction. In an embodiment, the table 14 is interrogated to determine characteristics of the transfer other than the transfer threshold.

The control module 10 receives the data associated with the off-loading transaction from the one or more library media 5 of the data storage device 3. In an embodiment, the data may include an index or indices 8 (as described above). If an index or indices 8 are present, then the control module 10 may read the index or indices 8 to determine a mode in which the data or part of the data is written to the tape 12. For example, the control module 10 may calculate the maximum multiple of the data blocks (using information recorded in the index or indices 8) that has a data volume size greater than the threshold but smaller than the maximum data volume size which the tape 12 can receive (this maximum may be set by characteristics of the tape 12, the tape drive 11 and/or the virtual tape library 3—for example the size of a data buffer or cache in which the data must be stored before it is transferred the tape 12).

If the data is a filemark (the location or locations of which may be stored in the index or indices 8) then the data may be directly transferred to the tape 12 irrespective of the threshold thereof. This may be known as an immediate writing operation.

The first device 2 may issue an abort signal after issuance of the off-loading instructions. The abort signal may be received by the control module 10 and, in response, the control module 10 may abort the off-loading transaction. The abortion of the off-loading transaction may comprise the deletion of any data already copied to the tape 12 (a long erase), the deletion of any index for the data copied to the tape 12 (a short erase), the resetting of the tape 12 into its original state before the transaction commenced, the ejection or disconnection of the tape 12 from the tape drive 11, and/or issuance of a signal to the first device 2 to confirm abortion of the transaction.

During the transaction, statistical information regarding the transaction may be recorded and/or transmitted to the first device 2. This statistical information may include the transfer rate, the quantity of data copied in the transaction, the portion of the total transaction which has been completed, and/or the expected time of completion for the transaction. In an embodiment, statistical information is sent to the first device 2 on request; in an embodiment, statistical information is sent to the first device 2 at predetermined intervals.

During a transaction the transaction may fail due to an error in the data storage device 3, the tape drive 11 or the tape 12. If an error occurs, then the transaction may be aborted as described above. In an embodiment, an error may occur if any data fails to be successfully copied as part of the transaction.

The data which is the subject of the transaction may be a data set; the data may be a virtual tape.

On the completion of a successful off-loading transaction, the virtual tape library 3 may, in an embodiment, delete the data which was the subject of the transaction from the library media 5. In an embodiment, the virtual tape library 3 may mark the data which was the subject of the transaction as read-only. An embodiment of the invention ensures that there is only one "active" copy of a volume of data; the active copy (which may be written to and read from) may be stored on the virtual tape library 3 or a tape 12. Thus, in this embodiment, when a copy of data is made one copy of the data is marked as an inactive copy and the other copy is marked as the active copy. If the copy of the data is a copy of inactive data, then the copy is also marked as inactive data. In an embodiment of the invention, inactive data is read-only. In an embodiment of the invention, inactive data is deleted. In an embodiment of the invention inactive data may be activated—for example, if the active data becomes lost or damaged.

In an in-loading transaction an analogous process occurs. A tape 12 containing data is connected to a tape drive 11. The connection may be as a result of instructions issued by the first device 2. Instructions are issued by the first device 2 to the control module 10 to initiate an in-loading transaction.

In an embodiment of the invention, an in-loading transaction begins with the control module 10 confirming that there is sufficient storage space on the one or more library media 5 to store a copy of the data on the tape 12. If there is insufficient capacity, then the control module 10 issues an error signal which may be handled in the same manner as the out-loading error signals. If there is sufficient capacity, then the data is copied from the tape 12 to the virtual tape library 3.

The in-loading process may be similar to the off-loading process with regard to, for example, error signals, statistics, active/inactive copies and/or transfer thresholds. As the data is being copied to the library media 5, an index or indices 8 of the data (as described above) are created and stored in or with the data. The index or indices 8 may contain data block sizes which are derived from the data copied from the tape 12.

The data may be a data set. The data which is copied to the virtual tape library 3 may form a virtual tape.

In an embodiment of the invention, as data is being copied to the data storage device 3 the control module 10 may generate an error checking code for all or part of the data being copied. The error checking code may be calculated as data is being copied or after the data has been copied.

Possible error checking codes which may be used with embodiments of the invention include cyclic redundancy checks.

In an embodiment of the invention, during a transaction, data may be written or copied to an auxiliary memory 15 of the tape 12. The data may include, for example, a virtual barcode, an identification code, a maximum configured data set size, and/or a read/right access code.

In an embodiment of the invention a record is maintained of data which has been written to the auxiliary memory 15 of the tape 12 and a description of the content of the tape. The description of the content of the tape 12 may comprise a data identifier. When new data is written to the tape 12 or to the auxiliary memory 15 of the tape, then the record is updated. The record may be maintained on the data storage device 3. The record may be maintained on the first device 2. The record may be maintained on a further device 7.

Figure 6:
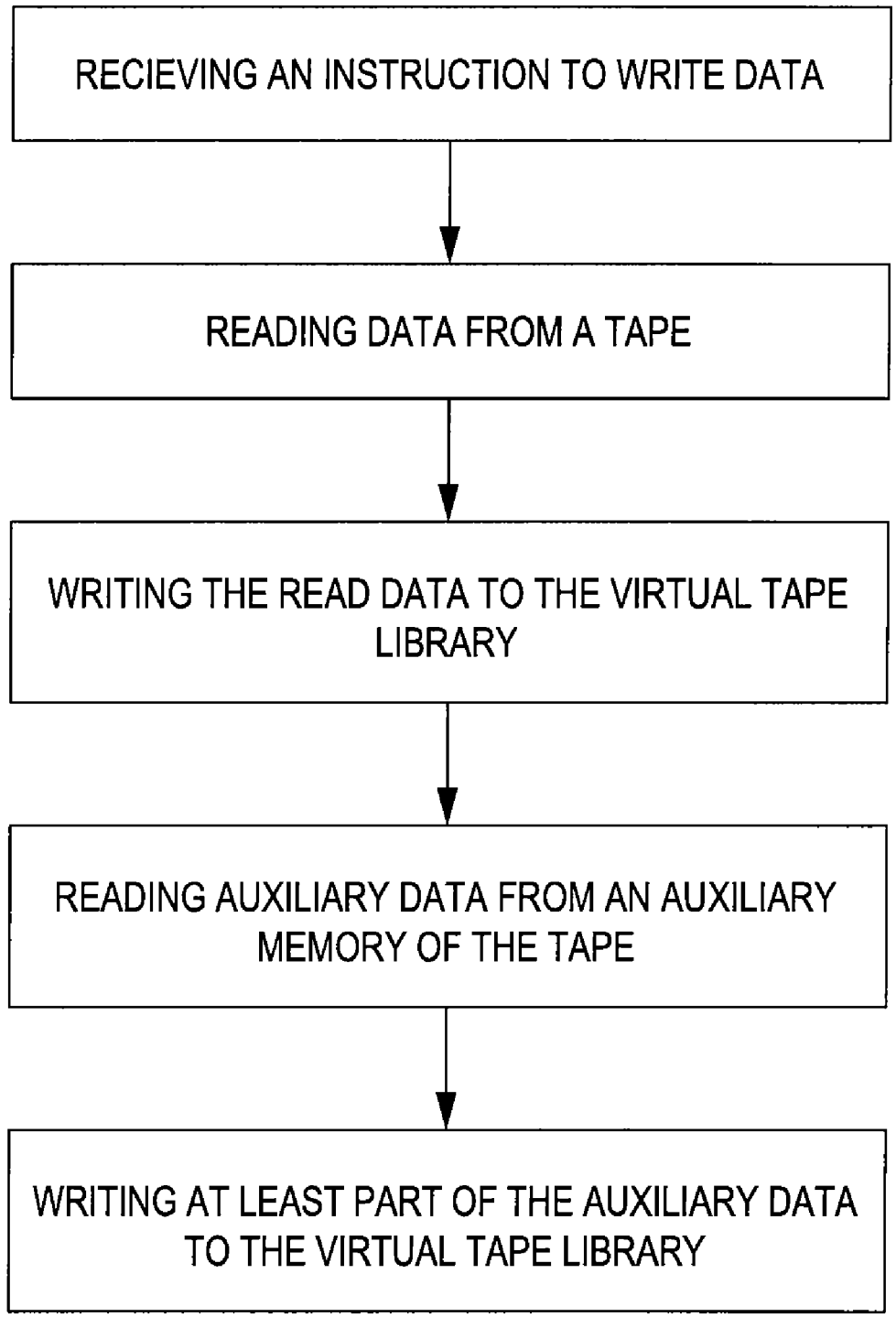
FIG. 6 shows a flowchart representing a method embodying the present invention.

In an embodiment of the invention, when data is written to the data storage device 3 from a tape 12, the content (or part of the content) of the auxiliary memory 15 of the tape 12 is copied to the data storage device 3 and may be associated with the data which has been copied from the tape 12 (see FIG. 6). Thus, if the data is later written to a tape 12, the auxiliary memory 15 of that tape 12 can be provided with at least some of the information which was stored on the auxiliary memory 15 of the original tape 12. In an embodiment, the data which may be written to the auxiliary memory of a tape and which is associated with data on the data storage device 3 is provided by the first device 2.

It will be appreciated that embodiments of the invention may be utilized to copy many data sets or virtual tapes to and from one or more tapes 12 and the virtual tape library 3.

In embodiments of the invention, one or more further devices 7 and/or further data storage devices 7 may be connected to the first 4 and/or second 6 communication networks.

It will be understood that embodiments of the present invention may reduce network demand and that transactions can occur during periods of high network demand where they were previously not possible or not allowed.

It will be understood that embodiments of the present invention may be implemented without increasing network demand. Thus, data may be transferred or copied to and from a tape without causing a substantial reduction in network availability for other processes.

Embodiments of the present invention may also aid in the reduction of network complexity.

For example, if the one or more tape drives 11 of an embodiment of the invention were attached to a server which was, in turn attached to the data storage device 3, then a software application may request the copying of data to a tape drive onto the data storage device 3. The request would be made over a communication network. The data would be read from the data storage device 3 to the server over a communication network. The data would then be written to a tape 12 in the tape drive. This comprises three instructions which must be passed through one or more communication networks. In addition, a large amount of data must be passed though a communication network from the data storage device 3 to the server.

In an embodiment of the present invention, an application on the first device 2 may request the copying of data from the data storage device 3 to a tape drive 11. The request is passed to the data storage device 3 which simply needs to write the data to a tape 12 in a tape drive 11 connected to the data storage device. This comprises just one two instructions and negates the need to pass the data itself through a communication network.

In an embodiment of the invention, the control module 10 comprises a computer program stored and run on the data storage device 3.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:
1. A virtual tape library apparatus, comprising:
a virtual tape library having a processing unit and an operating system executable on the processing unit;
a tape drive connected to the virtual tape library, the tape drive being operable to receive a tape, wherein operations of the tape drive are directly controlled by the operating system executing on the processing unit of the virtual tape library and, the virtual tape library comprises:

one or more library media, wherein operations of the library media are directly controlled by the operating system executing on the processing unit;

one or more virtual data tapes stored on the one or more library media; and a control module coupled to the tape drive and one or more library media, wherein, when executed on the processing unit, the control module, in combination with the operating system, directly controls transfer of data between the virtual tape library and a tape received by the tape drive, wherein the control module includes transfer characteristics for data transfer operations and directly controls transfer of the data between the virtual tape library and the tape in accordance with the transfer characteristics, wherein the transfer characteristics include a transfer volume threshold corresponding to a minimum volume of data to transfer to the tape in a single transaction, and wherein the control module buffers data to be transferred to the tape and transfers the buffered data to the tape only after the volume of the buffered data is above the transfer volume threshold.

2. The apparatus of claim 1, wherein the tape drive is attached to the virtual tape library.

3. The apparatus of claim 1, wherein the tape drive is directly connected to the virtual tape library.

4. The apparatus of claim 1, wherein the transfer characteristics further include a data transfer rate for transfer of the data between the virtual tape library and the tape, and wherein the control module directly controls transfer of the data from the virtual tape library in accordance with the data transfer rate.

5. A method of transferring data between a virtual tape library and a tape received by a tape drive, comprising:
providing a processing unit;
providing a virtual tape storage medium connected to a data bus;
providing a tape drive connected to the data bus; and
providing a control module coupled to the virtual tape storage medium and the tape drive, the control module including transfer characteristics for data transfer operations, wherein, when executed on the processing unit, the control module directly controls transfer operations between the virtual tape storage medium and the tape drive in response to receipt of a data transfer instruction and in accordance with the transfer characteristics,
wherein the transfer characteristics include a transfer volume threshold, and wherein the control module directly controls transfer operations so that data is transferred to the tape drive only after the volume of data on the virtual tape storage medium is above the transfer volume threshold.

6. The method of claim 5, wherein the transfer volume threshold corresponds to a minimum volume of data to transfer to the tape drive in a single transaction, and the method further comprises buffering data to be transferred to the tape drive until the volume of the data to be transferred is above the transfer volume threshold.

7. The method of claim 5, wherein the transfer characteristics further include a data transfer rate, and the method further comprises transferring, under direct control of the control module, the data between the virtual tape library and the tape at the data transfer rate.

8. The method of claim 5 further comprising:
reading auxiliary data from an auxiliary memory of a tape received by the tape drive; and
writing at least part of the auxiliary data to the virtual tape storage medium.

\* \* \* \* \*